United States Patent Office 2,930,854
Patented Mar. 29, 1960

2,930,854

KEY SENDER

Gerald R. Paul, Webster, N.Y., assignor to General Dynamics Corporation, Rochester, N.Y., a corporation of Delaware Application December 23, 1957, Serial No. 704,486

12 Claims. (Cl. 179—90)

This invention relates to signaling devices and particularly to means for transmitting trains of digital pulses useful in telecommunication systems.

An object of the invention is to provide means for automatically timing and transmitting a plurality of digital trains of pulses including both the pulses of the various trains and the interdigit time intervals between said trains.

Another object of this invention is to provide limiting means whereby the device may send any number of digital trains of pulses but will always come to a halt and produce a signal that all of and only the numbers written up have been transmitted.

The invention resides primarily in an electronic device controlled by a simple set of digit keys and a number of controlling relays to be connected to a telephone substation circuit in place of the ubiquitous dial. It is especially useful in situations where an operator is provided with dialing means but may be used elsewhere. It operates on the principle of translating the digits to be transmitted to expressions which may be counted down from such an expression representing a digit to a given standard expression, which being reached constitutes a signal that the operation is complete.

The invention is characterized by the use of a means for counting down a fictitious number between each digital transmission for measuring what is known as interdigit time. Consequently the device is characterized by the use of a pulsing relay which periodically operates over the complete dialing period and which not only controls the counting of the number of pulses for the complete number consisting of a plurality of digits but also controls the counting of the number of pulses for each fictitious interdigt timing digit interpolated in such transmitted number.

By this means the said pulsing relay may be operated from a constantly operating multivibrator which may be precisely adjusted to provide the proper periodicity of pulsing and the proportionate division of each cycle into the proper make and break intervals. By this means the advantages of a constantly running device over a frequently stopping and starting device may be gained.

The invention is further characterized by the use of counting in and counting out chains having a unique mutual control whereby an indefinite number of digits may be stored and then transmitted, that is, only the same number of digits will be transmitted as have been stored. A single digit may be stored and then transmitted out, or a complete telephone designation of ten (for direct distance dialing) or of seven (for local calling) digits may be handled.

A feature of the invention is the use of means controlled by the counting in chain to constitute an enabling signal in the counting out chain whereby the number of transmitted digits is limited strictly to the number of recorded digits. In accordance with this feature the point reached along the counting in chain becomes a limiting signal for the counting out chain.

A feature of the invention is a transmitting register into which the expression of a digit to be dialed is introduced and which may be counted down to an expression constituting a stop signal. This register consists essentially of a chain of trigger circuits arranged in a binary circuit whereby the first in line being constantly subjected to a train of incoming pulses, controls the others in accordance with the principles of binary addition. Since four such triggers will serve to represent more than the ten digits used for telephone number designations, accordingly four triggers are provided. To this string of four trigger circuits, and since the counting down process always ends with a change in the fourth trigger, another trigger circuit is added to the chain to count the odd and even number of count down operations. The odd numbered operations represent digits actually transmitted while the even numbered operations represent fictitious digits counted down but not transmitted.

In accordance with this feature a relay (DOS) is provided to respond to said odd and even counting trigger to control the read out chain and which, upon the release thereof after an even count down operation, will act to advance such chain, the said relay being operated at the end of an odd count down operation and remaining operated during the following even count down operation.

Another feature of the invention is an end of sending relay (EOS) which responds when the counting out chain "catches up" with the counting in chain and which thereupon terminates operations of the device including the further operation of said constantly operating multivibrator and its controlled pulse relay.

Another feature of the invention is a reorder means by which the train of switches set by a sender release operation may be released without wiping out the record established in the registers of the device whereby another dialing operation may be performed without the necessity of writing up anew the digits of the called number.

In accordance with this feature and since the operations stopped by the end of sending relay do not allow an interdigit count to be made after the transmission of the last digit, and consequently the odd-even count trigger is left in its binary 1 condition, the said reorder key includes means to reset the said odd-even count trigger to its binary zero condition whereby it is set into condition to properly count the first digit transmitted following such reorder operation.

Other features will appear hereinafter.

The drawings consist of five sheets having seven figures as follows.

The prior art

Two particular examples of the prior art are herein noted for the purpose of inclusion by reference:

Patent 2,854,521, September 30, 1958, Morris et al.
Ser. No. 641,657, February 21, 1957, Fisher, Jr.

The first of these shows a sender responsive to dial pulses for producing outgoing dial pulses, whereas the second shows the use of neon tubes for diode purposes and which is incorporated in the first as a part thereof.

The sender of the present invention has many circuits in common with the Morris et al. dial to dial sender including particularly the manner of registering a digit as the fifteens complement of one less than the value of the digit whereby the outgoing train of pulses is produced by counting down such an expression until a particular code which acts as a signal is obtained.

By way of example, and since it forms an important part of the present invention, the interdigit time is considered to be six pulse lengths and therefore as the sending of a telephone number digit is completed, the register which is counted down is reset to the inverted value of six minus one. In the binary code six is written as 0 1 1 0 and five is written as 0 1 0 1 and the 15's complement of five is written as 1 0 1 0

Since reading is usually from left to right, this is represented as 0 1 0 1

The counting down consists of successively adding 1 to the left hand place, whereby the six successively added binary digits successively produce the following representations:

| | | | | |
|---|---|---|---|---|
| After 1st added binary digit | 1 | 1 | 0 | 1 |
| After 2nd added binary digit | 0 | 0 | 1 | 1 |
| After 3rd added binary digit | 1 | 0 | 1 | 1 |
| After 4th added binary digit | 0 | 1 | 1 | 1 |
| After 5th added binary digit | 1 | 1 | 1 | 1 |
| After 6th added binary digit | 0 | 0 | 0 | 0 |

Thus, the counting down process starts with the entry into the outgoing register of the fifteens complement of one less than the number to be dialed and ends with the outgoing register being completely cleared and ready for the next operation.

The circuitry

The circuitry shown in schematic form in Figs. 1 to 5 inclusive represents a key sender which may be connected to a conventional telephone substation circuit in place of the conventional dial. In operation, the subscriber or the operator, where this may be used by such a person, will first operate the conventional hook switch and then write up the number of the called line, digit by digit by means of the keys shown in Fig. 1. Each operation of such a key will set a register and advance the incoming chain so that the next register will be enabled. When the number is completely written up, the subscriber or the operator will depress the sender release key whereupon the device will operate to transmit the number so registered.

The device is characterized by the use of a pulsing relay which will be constantly and regularly operated at a precise rate and which will count off the pulses of each digit and the pulses of a fictitious digit used to measure interdigit time.

If no answer is obtained from the called party and the subscriber wishes to reset the dialed connection, she may depress the reorder key which will release the connection and reset the device to dial the same number again, the record written up previously being retained and the outgoing chain being recycled.

If the subscriber wishes to release the dialed connection and the stored number, she depresses the hook switch or its equivalent whereby the record in the registers may be released so that a new number may be keyed.

Figure 5:
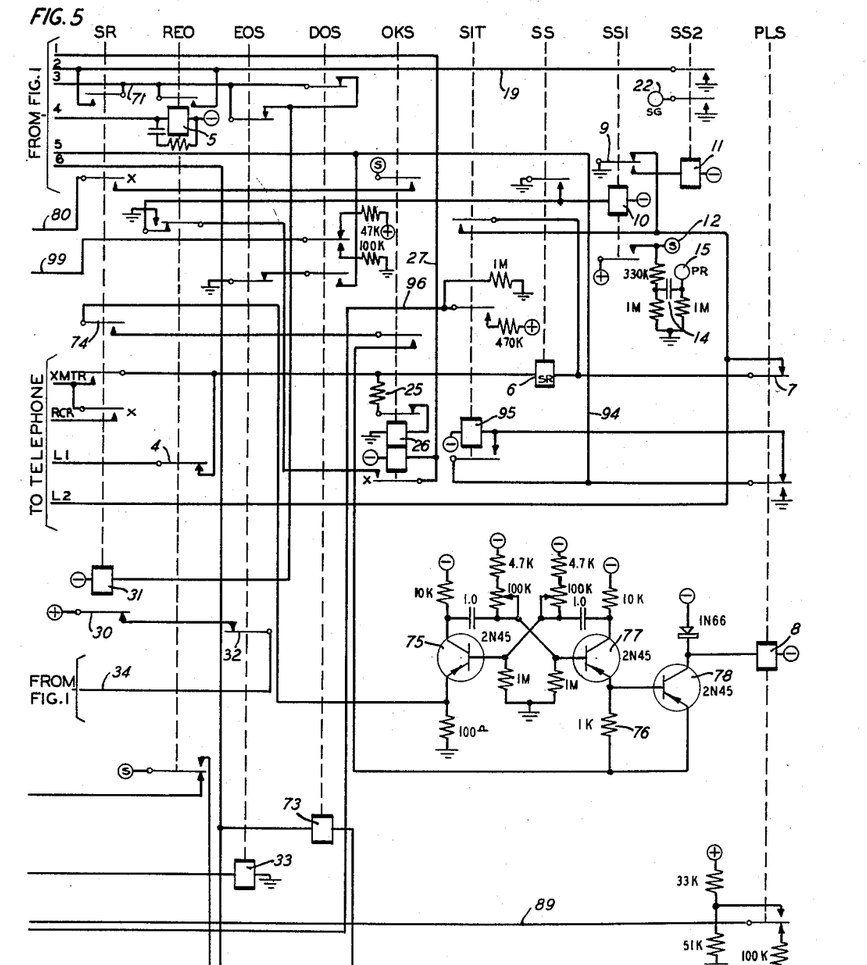
Fig. 5 is a schematic circuit diagram showing the ten relays employed herein and the transistor multivibrator employed to constantly and periodically operate the pulsing relay at a precisely controlled rate.

For these purposes a number of conventional relays are employed as shown in Fig. 5 and which may be shortly described as follows.

SR is the sender release relay which is operated by the sender release key after the operator or subscriber has written up the wanted number and which when operated functions to start the sending of the outgoing trains of pulses.

REO is the reorder relay which may be operated by the reorder key to recycle the device so that a recorded telephone number may be dialed without the necessity of writing up the number on the digital keys again.

EOS is the end of sending relay and is arranged to operate when the proper number of trains of outgoing pulses have been sent.

DOS is the dial out stop relay which operates at the end of each train of pulses which are transmitted, that is when the record transferred to the out pulse register has been completely counted down and the binary 8 registration changes from binary 1 to binary 0 and releases at the end of each train of pulses representing the fictitious digits.

OKS is the OK to start relay which becomes operated when all conditions necessary to proper operation have been met and it is proper for the automatic operations to begin.

SIT is the start interdigit timing relay which becomes operated after each train of pulses has been spent to start the counting down of the interdigit time. Since the pulse relay is continuously operated by a continuously operating multivibrator and the interdigi time is taken to be equal to six pulse lengths, the SIT relay operates to reset the out pulse register to a fictitious six value so that this must then be counted down before the next digit is transferred thereto.

SS is the start relay which becomes active as soon as the hook switch has been operated and which acts to activate the device of the present invention which substitutes for the conventional dial.

SS1 and SS2 are slave relays which faithfully follow the SS relay, SS1 acting to establish a supply of signal battery and a priming signal and SS2 acting to establish a main and a signal ground.

PLS is the pulse relay which continuously operates under control of a multivibrator adjusted to the proper periodicity for dialing and the proper proportional make and break timing.

Operation

Figure 7:
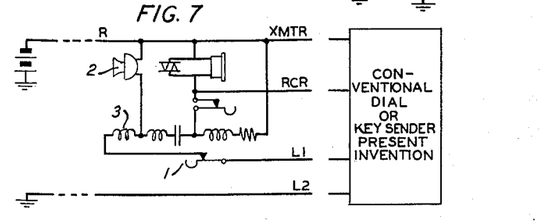
Fig. 7 is a schematic circuit diagram of a conventional telephone substation circuit to which either a conventional dial or the device of the present invention may be connected.

When the hook switch 1 of the telephone is closed in the position shown, the conventional line current will flow over the ring of the line, through the circuitry of the telephone set consisting principally of the transmitter 2 and coil 3, to the L1 terminal, thence through the armature 4 and back contact of the REO relay 5, the winding of the SS relay 6, the armature 7 and the back contact of the PLS relay 8, the back contact and armature 9 of the SS1 relay 10 to ground. While another ground may be found leading back over the L2 conductor to the tip of the line, this more solid ground is temporarily provided to insure the prompt operation of the SS relay 6.

The SS relay causes the immediate operation of its slave, the SS1 relay 10 and this in turn causes the operation of the SS2 relay 11.

Figure 2:
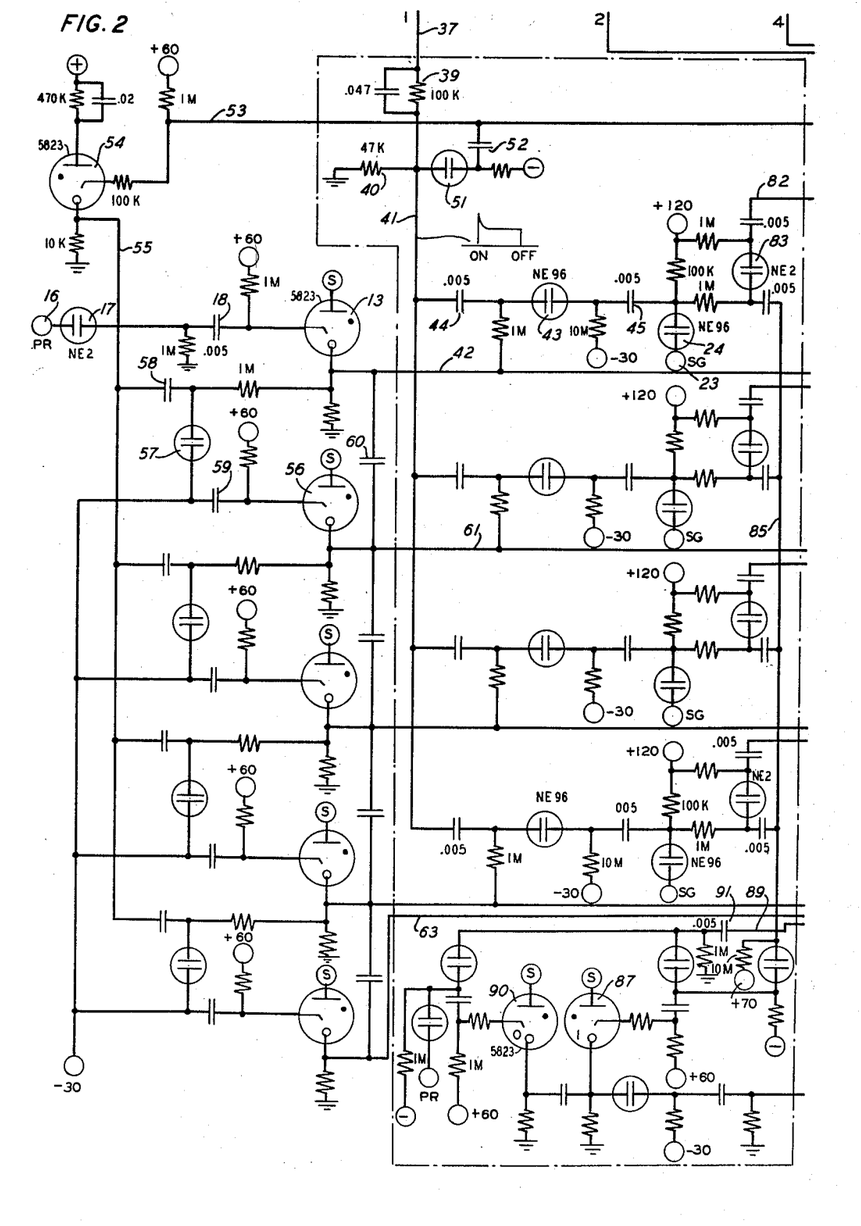
Fig. 2 is a schematic circuit diagram showing the counting in chain, the 1 bit register sections of four (representative) registers and the 1 bit trigger circuit of the transmitting register.

The SS1 relay 10 applies battery to the signal battery terminal 12 here shown as a circle enclosing the letter S and which is permanently connected to many other points in the circuitry such as the anodes of the switching tubes like the first tube 13 of the input counting chain (Fig. 2). This application of battery to terminal 12 also acts through condenser 14 to transmit a single pulse to the priming terminal 15, which again is connected to many other points in the circuitry such as the terminal 16, where it passes a pulse through the neon lamp 17 and the condenser 18 to the trigger terminal or grid of the tube 13. This priming pulse is also passed to the four binary 0 tubes of the four flip flops comprising the outgoing digit register to set this register to 0000.

Figures 1, 6:
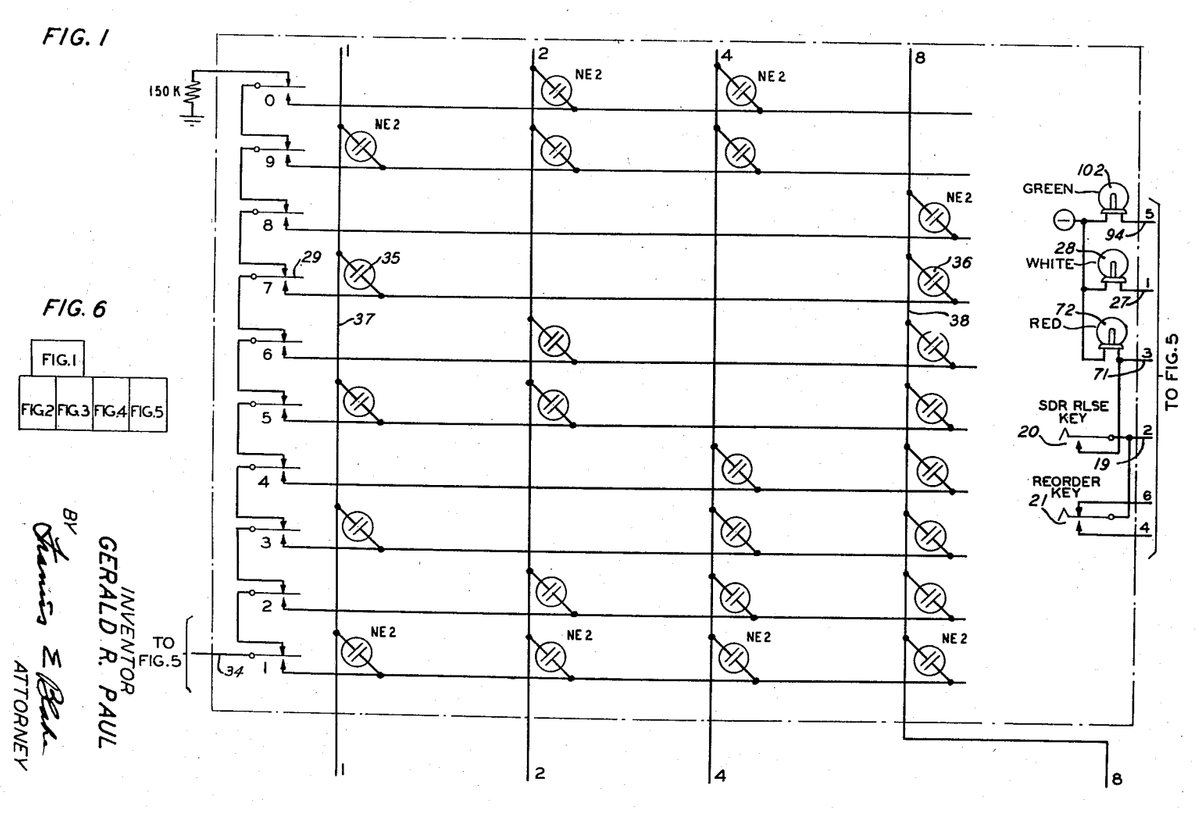
Fig. 1 is a schematic circuit diagram showing the circuitry within the key box placed at the disposal of the subscriber, including the ten digital keys, the sender release key, the reorder key, and the three signal lamps as well as the neon tube lamps employed to translate the decimal value of the digital keys and to transmit the binary representations over the 1, 2, 4 and 8 bit wires leading to the various registers.
Fig. 6 is a block diagram on the same sheet as Fig. 1, indicating the arrangement of Figs. 1 to 5 to form a complete circuit diagram.

The SS2 relay 11, places a ground on the conductor 19 to enable the sender release key 20 and the reorder key 21. At the same time it places a ground on the signal ground terminal 22 which again will be found duplicated at all the terminals of the neon register lamps, such as the terminal 23 for the lamp 24, whereby each of the registers is made ready for operation.

Upon the removal of the low resistance ground connection to the back contact of armature 9 of the SS1 relay 10, and providing the direct ground to the tip has been removed in the central office line circuit by the proper extension of the circuit to a first selector, a sufficient current from the telephone line circuit will flow through the resistor 25 and the upper winding of the OKS relay 26 to move its sensitive X armature so that this relay now becomes locked through its lower winding to the ground supplied by the SS relay 6. The OKS relay now becomes fully operated and disconnects its upper winding from the L1 circuit. At the same time the ground supplied for the holding of the OKS relay 26 is supplied over conductor 27 to the white signal lamp 28 to notify the subscriber that the sender is idle and that it is OK to send, that is, the digit keys may be operated.

Let it now be assumed that the subscriber operates the number 7 digit key 29. This will connect battery over the armature 30 and back contact of the SR relay 31, the back contact and armature 32 of the EOS relay 33, conductor 34 through the closed contacts of the 1 to 7 digit keys to the front contact of the digit key 29 and thence to the neon lamps 35 and 36 to the wires 37 and 38 respectively. Tracing wire 37, we see that a connection is made through a resistor 39 and a resistor 40 to ground whereby the neon lamp 35 will conduct and thereby apply a raised potential to the wire 41. The wave shape of the pulse applied to wire 41 is shown schematically in Fig. 2 and this indicates that as the key 29 is operated a pulse, through the .047 condenser bridged about resistor 39 is first delivered to the wire 41 and thereafter until the key 29 is off a steady potential as limited by the resistor 39 is applied thereto. The pulse is great enough to fire any lamps such as the gate 43 and the register lamp 24, but the potential maintained on this wire 41 after the initial pulse and until the key is released is insufficient to fire such lamps or tubes so that since the steering-in chain is advanced long before the subscriber releases the key 29 such raised potential will not result in the firing of a register gate or lamp in the next register.

It has heretofore been stated that the tube 13 was triggered and hence its cathode and therefore the wire 42 are at a raised potential. This potential by itself is not sufficient to fire the neon lamp 43 but when the potential pulse on wire 41 is transmitted, a pulse through condenser 44 is applied to the lamp 43 and it passes a pulse through the condenser 45 to fire the lamp 24 which therefore comes aglow and remains in this state until the signal ground on terminal 23 is removed.

In the same manner the lamp 46 (Fig. 4) is caused to glow but lamps 47 and 48 failing to receive pulses over wires 49 and 50 respectively do not respond to the key 29.

As the subscriber depresses the key 29, a pulse is transmitted into wire 41 as hereinabove stated. Upon the raising of the potential on wire 41 the neon lamp 51 will be fired and a pulse will be produced in condenser 52 and transmitted over wire 53 to trigger the tube 54. This tube fires momentarily and therefore produces a positive pulse on wire 55. The effect of this is to trigger the next tube 56 in the steering in chain. Since the tube 13 is conducting at this time the gate lamp 57 is in a condition to pass a pulse from the wire 55 over the condenser 58, through the gate 57 and the condenser 59 to the trigger of tube 56. As tube 56 fires the pulse produced in condenser 60 acts to quench the tube 13 so that the next incoming signal on wire 41 may be used in any one of the register circuits controlled by the wire 61.

In this manner the steering in chain will successively enable an equal number of registers to successively register the digits written up by the subscriber.

Figure 4:
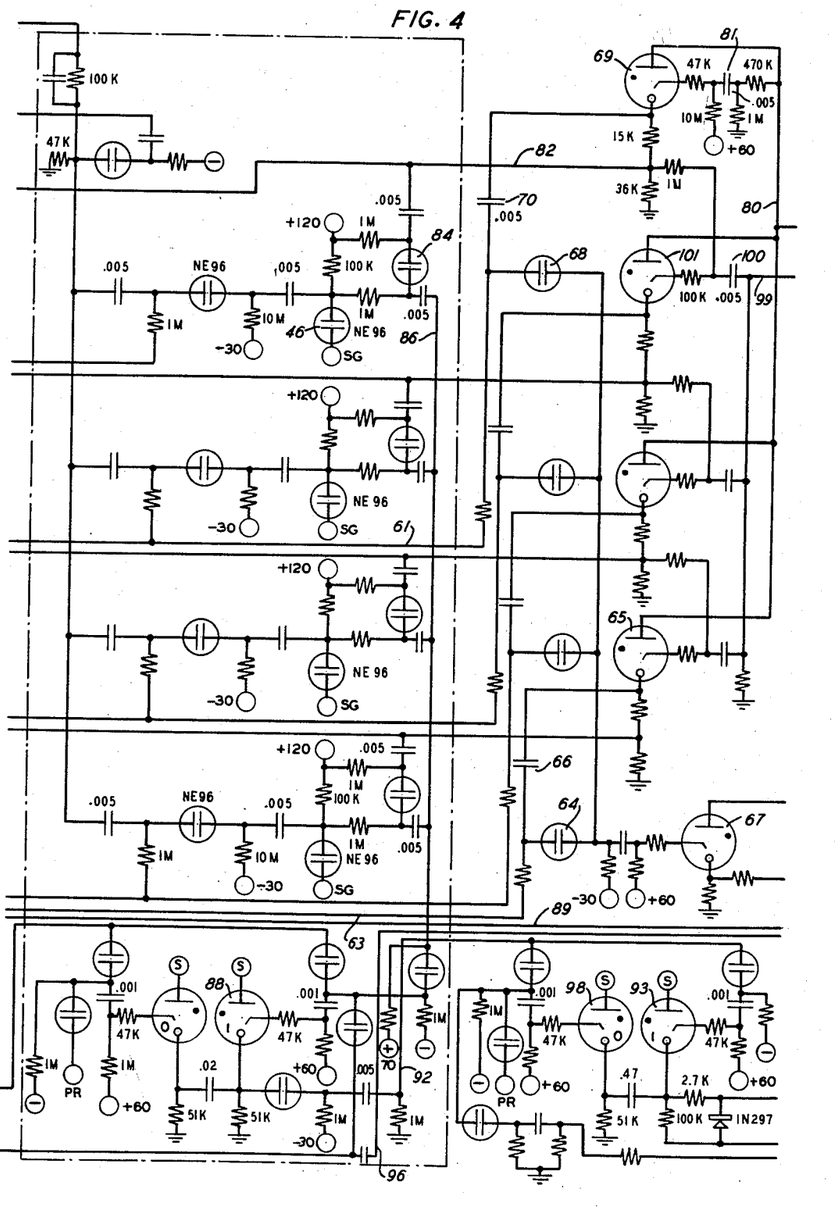
Fig. 4 is a schematic circuit diagram showing the 8 bit register sections of the said four representative registers, the 8 bit trigger circuit and the odd-even count trigger circuit of the transmitting register as well as the counting out chain.

Herein, by way of example, four such registers are shown and five tubes in the steering in chain are shown. The last tube 62 which is fired as the subscriber releases the last key, raises the potential on wire 63 to enable the gate lamp 64 so that under normal conditions when the steering out chain has advanced to the firing of the last tube 65 a pulse produced thereby through condenser 66 will trigger the end of sending tube 67 to operate the end of sending EOS relay 33.

It may be brought out at this point that if the subscriber writes up but a single digit the potential on wire 61 will be raised to enable the gate lamp 68 so that thereafter if the sending is started it will go no further than to send a single digit, for upon the firing of the first steering out tube 69, a pulse over the condenser 70 will be transmitted over the gate lamp 68 to trigger the end of sending tube 67.

Thus, when the subscriber has written up the full or even a partial designation he may cause the sending to start by operating the sender release key 20, thereby connecting the ground on conductor 19 to conductor 71 leading to the red signal lamp 72 and over back contacts and armatures of the EOS relay 33 and the DOS relay 73 to the winding of the SR relay 31. The sender release relay 31 operates and shorts the transmitter and receiver of the telephone set for better transmission of the outgoing pulses and to prevent the subscriber from hearing such pulses and through its armature 74 enables the multivibrator by interconnecting the emitter of transistor 75 with the resistor 76 leading to the emitter of transistor 77 and with the emitter of transistor 78.

The multivibrator including the three transistors, 75, 77 and 78 is conventional in its operation and is adjusted to operate the PLS pulsing relay at a regular rate, by way of example, at 10 pulses per second at a 40 to 60 make-break ratio. Thus, upon the operation of the sender release key 20 the pulsing relay will start to operate at a regular rate and will continue to so operate until both the EOS relay 33 and the DOS relay 73 have been operated and the SR relay 31 is thereby released.

Figure 3:
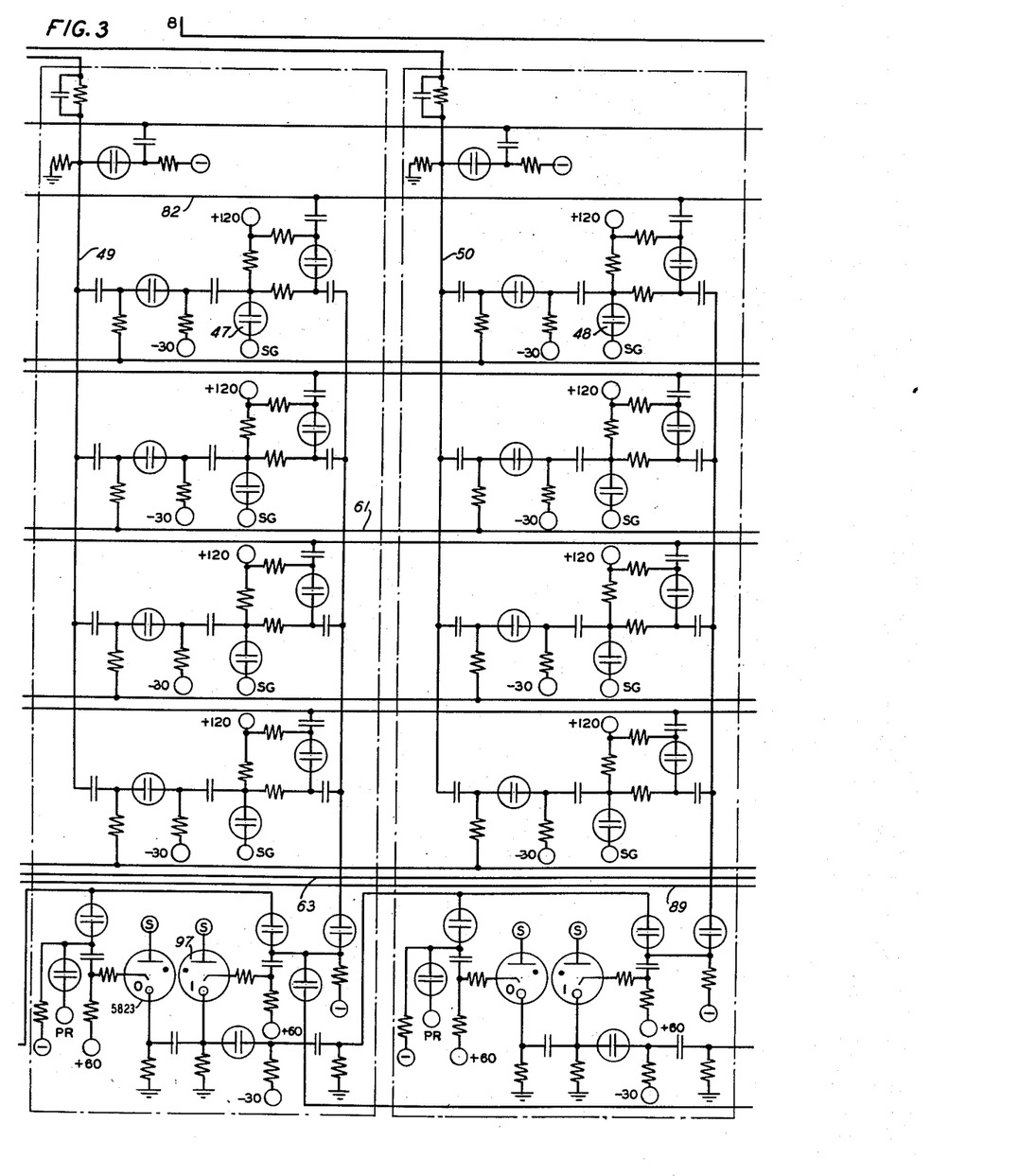
Fig. 3 is a schematic circuit diagram showing the 2 bit and 4 bit register sections of the said four representative registers and the 2 bit and 4 bit triggers of the transmitting register.

Let it be assumed that the subscriber has keyed a full number and that all the registers have been filled. Then upon the operation of the SR relay 31, a signal battery will be extended over an armature and front contact of the OKS relay 26, the front contact and sensitive X armature of the SR relay 31, conductor 80 to the anode of the tube 60, at the same time transmitting a pulse through the condenser 81 to trigger this tube. This will cause a raise in potential on conductor 82, and since the lamps 24 and 46 are aglow as before described so that the neon glow lamp gates 83 and 84 respectively are enabled, pulses will be transmitted over conductors 85 and 86 respectively to trigger the tubes 87 and 88 respectively, thus writing up in the transmitting register the value 1001.

It may now be noted that the PLS relay 8 will continuously apply a train of pulses to the conductor 89, leading to the flip flop composed of tubes 90 and 87, through the condenser 91. This will count down the registration 1001 set in this transmitting register, producing the following results.

After 1 pulse the registration becomes ____ 0 1 0 1
After 2 pulses the registration becomes ___ 1 1 0 1
After 3 pulses the registration becomes ___ 0 0 1 1
After 4 pulses the registration becomes___ 1 0 1 1
After 5 pulses the registration becomes ___ 0 1 1 1
After 6 pulses the registration becomes ___ 1 1 1 1
After 7 pulses the registration becomes ___ 0 0 0 0

Thus it will be seen that seven pulses are counted and that on each such pulse the line circuit to the telephone is opened by the armature 7 of the PLS relay 8. The SS relay 6 is slow to release so that it does not release on any one of these pulses.

As the tube 88 of the 8 bit flip flop is quenched a pulse is transmitted over the common trigger wire 92 to cause the triggering of tube 93, which thereupon causes the operation of the DOS relay 73. This is the dial out stop relay whose function is to stop the transmission of pulses over the line. The operation of this relay therefore establishes a circuit from ground to the conductor 94 and thereupon through a back contact and armature of the PLS relay 8 to the winding of the SIT relay 95, which establishes a bridge about the armature 7 and back contact of the PLS relay 8. Thus, as soon as the digit 7 has been transmitted, the SIT (start interdigit timing) relay 95 is operated to keep the continued pulsing of the PLS relay from affecting the line.

Upon the operation of the SIT relay 95, battery is applied to conductor 96 for the purpose of triggering tubes 97 and 88 thus writing up the binary complement of the fictitious value 6 (0101) in the transmitting register, which must now be counted down as before. When this operation is complete the tube 98 will be triggered and the DOS relay 73 will be released.

Upon the operation of the DOS relay, conductor 99 is connected to ground through 100K and this discharges the condenser 100 so that after the interdigit six pulses are counted and the DOS relay releases, battery will again be placed on this conductor 99. This will trigger the second tube 101 in the counting out chain. The operation of tube 101 transfers the registration in the second storage register to the transmitting register as before described so that the next digit may now be transmitted. Upon this release of the DOS relay the SIT relay is released to take the bridge off the pulsing contacts.

It may be noted that the green signal lamp 102 is connected to conductor 94 so that it will indicate the closed condition of the telephone line, winking on each digital pulse transmitted thereover.

When the transmission of the last digit has been completed the EOS relay is operated as before described and this will, in conjunction with the DOS relay 73, open the circuit to the SR relay and stop further circuit operations. If in due time the called party answers, a conversion may be held conventionally. During this period the OKS, the DOS, the EOS, the SS, the SS1 and SS2 relays will remain in operation. At the end of the conversation, when the hook switch 1 is opened, these relays will release and the circuit will be returned to normal.

*Reorder*

After a complete operation of the device, and before release as above, should the subscriber wish to dial the connection again without having to write up the number, he will momentarily operate the reorder key 21. This will cause the operation of the REO relay 5, open the connection to L1 and thus drop off the train of switches. While the SS relay 6 may release if the operation of the reorder key is prolonged, the reorder relay will place a substitute ground on the winding of the SS1 relay 9 so that the signal battery and the signal ground are not disturbed and hence the record established in the various registers is not lost. All the other relays excepting SS1 and SS2 are restored and all signal lamps are put out. It will be noted that the plate circuit to tube 67 is opened so that this tube is extinguished and therefore the EOS relay 33 is restored. Tube 98 is primed, whereby tube 93 is extinguished and therefore the DOS relay 73 is released. However, the operation of the REO relay 5, reoperates the SR relay 31, connecting lead 80 to the front contact of the OKS relay so that sending may begin as soon as the OKS relay 26 operates. As soon as the reorder key 21 is restored to normal the OKS relay 26 and the SS relay 6 will restore and the device will assume that stage of operation reached after the called number had been written up and the SR key operated. The operation will now be in accordance with the previous operation above described.

What is claimed is:

1. A sender for controlling the transmission of numbers in the form of a series of trains of digital pulses, consisting of a register, means for setting said register to representations of selected digits, means for setting said register to representations of fictitious digits, means for counting down said settings to clear said register, means for transmitting outgoing pulses during and corresponding to said counting down of said selected digits, and means for preventing the transmission of outgoing pulses during said counting down of said fictitious digits and means responsive to said means for counting down selected digits for operating said means for setting said register to representations of fictitious digits.

2. A sender for controlling the transmission of numbers in the form of a series of trains of digital pulses, comprising a register consisting of a series of binary trigger circuits, means for entering therein selected digits and fictitious digits expressed as 15—(n—1) in binary code where n is equal to a said digit, means for counting down said register consisting of means for repeatedly entering into said register a binary 1 to advance the condition of said register through increasing values to a binary code 0000, said counting down means including a pulsing relay, means for regularly and repeatedly operating said pulsing relay, an outgoing signal circuit controlled by said pulsing relay and means for rendering the control of said pulsing relay over said outgoing signal circuit ineffective during the said counting down of a fictitious digit.

3. A sender for controlling the transmission of numbers in the form of a series of trains of digital pulses, comprising a register consisting of a series of binary trigger circuits, means for entering therein selected digits and fictitious digits expressed as 15—(n—1) in binary code where n is equal to a said digit, means for counting down said register consisting of means for repeatedly entering into said register a binary 1 to advance the value of the number registered therein through increasing values to a binary code 0000, said register including in said series an additional binary trigger circuit for exhibiting the odd and even number of times said register has been counted down, said counting down means including a pulsing relay, means for regularly and repeatedly operating said pulsing relay, an outgoing signal circuit controlled by said pulsing relay, and means controlled by said additional binary trigger circuit for rendering the control of said pulsing relay over said outgoing signal circuit alternately effective and ineffective responsive to the odd or even count exhibited thereby.

4. A sender for controlling the transmission of numbers in the form of a series of trains of digital pulses, comprising a register consisting of a series of binary trigger circuits, means for entering therein digits selected for transmission and digits employed for timing purposes, each digit being in binary code for $16-n$ where $n$ is the said digit, means for clearing said register after the entry of a digit therein consisting of means for entering thereinto successively and repeatedly a binary 1 until the said code is reduced to 0000, said register including in said series an additional trigger circuit for indicating the odd and even number of times said register has been counted down to said 0000 representation, said means for clearing said register consisting of a pulsing relay, a multivibrator for continuously and repeatedly operating said pulsing relay and a SIT, start interdigit timing, relay responsive to odd indications produced by said additional trigger circuit for interpolating timing digits between said digits selected for transmission, said pulsing relay having contacts for transmitting outgoing signal pulses and said SIT relay having contacts for shunting said pulsing relay transmitting contacts.

5. A sender for controlling the transmission of numbers in the form of a series of trains of digital pulses, comprising a transmitting register consisting of a series of binary trigger circuits, a plurality of storage registers, a steering in chain for successively enabling said storage registers for receiving digits in the binary code of $16-n$ where $n$ is the said digit, a steering out chain for successively enabling said storage registers for transmission of digits stored therein to said transmitting register, means for simultaneously transmitting digital pulses and entering pulses into said transmitting register to advance the code contained therein to the ending code 0000, means responsive to the said code 0000 for advancing said steering out chain and means controlled by said steering in chain for limiting the operation of said steering out chain to an equal number of steps.

6. A sender for controlling the transmission of numbers in the form of a series of trains of digital pulses, comprising a transmitting register consisting of a series of binary trigger circuits, a plurality of storage registers, a steering in chain for successively enabling said storage registers for receiving digits in the binary code of $16-n$ where $n$ is the said digit, a steering out chain for successively enabling said storage registers for transmission of digits stored therein to said transmitting register, means for simultaneously transmitting digital pulses and entering pulses into said transmitting register to advance the code contained therein to the ending code 0000, means responsive to the said code 0000 for advancing said steering out chain, means for interpolating timing digits between each said digit transmitted by said transmitting means, means for preventing the transmission of pulses during the counting down of said timing digits and means controlled by said steering in chain for limiting the operation of said steering out chain to an equal number of steps.

7. A sender for controlling the transmission of numbers in the form of a series of trains of digital pulses, comprising a transmitting register consisting of a series of binary trigger circuits, a plurality of storage registers, a steering in chain for successively enabling said storage registers for receiving digits in the binary code of $16-n$ where $n$ is the said digit, a steering out chain for successively enabling said storage registers for transmission of digits stored therein to said transmitting register, means for simultaneously transmitting digital pulses and entering pulses into said transmitting register to advance the code contained therein to the ending code 0000, means responsive to each odd numbered occurrence of said code 0000 for preparing a circuit to advance said steering out chain and responsive to each even numbered occurrence of said code 0000 for advancing said steering out chain, means responsive to the said advance of said steering out chain to enter the next stored digit into said transmitting register and means responsive to each odd numbered occurrence of said code 0000 for resetting said transmitting register to a fictitious digit constituting an interdigit timing digit, means for preventing the transmission of pulses during the counting down of fictitious digits and means controlled by said steering in chain for limiting the operation of said steering out chain to an equal number of steps.

8. A sender for controlling the transmission of numbers in the form of a series of trains of digital pulses, comprising a transmitting register consisting of a series of binary trigger circuits, a plurality of storage registers, a steering in chain for successively enabling said storage registers for receiving digits in the binary code of $16-n$ where $n$ is the said digit, a steering out chain for successively enabling said storage registers for transmission of digits stored therein to said transmitting register, means for simultaneously transmitting digital pulses and entering pulses into said transmitting register to advance the code contained therein to the ending code 0000, an additional trigger circuit in said series of trigger circuits constituting said transmitting register to count the odd and even occurrences of said ending code 0000, a sender release key for starting the operation of said steering out chain, means controlled by said steering in chain for terminating the operation of said steering out chain at any given step therein and a reorder key for restarting the operation of said steering out chain whereby a number entered into said storage registers may be transmitted repeatedly.

9. A sender for controlling the transmission of numbers in the form of a series of trains of digital pulses, comprising a transmitting register consisting of a series of binary trigger circuits, a plurality of storage registers, a steering in chain for successively enabling said storage registers for receiving digits in the binary code of $16-n$ where $n$ is the said digit, a steering out chain for successively enabling said storage registers for transmission of digits stored therein to said transmitting register, means for simultaneously transmitting digital pulses and entering pulses into said transmitting register to advance the code contained therein to the ending code 0000, an additional trigger circuit in said series of trigger circuits constituting said transmitting register to count the odd and even occurrences of said ending code 0000, means controlled by said additional trigger circuit responsive to the indication of an even count therein to transfer a stored digit to said transmitting register, means further controlled by said additional trigger circuit responsive to the indication of an odd count therein to automatically set said transmitting register to a fictitious value as an interdigit timing digit, means controlled by said last means for preventing the transmission of digital pulses during the said counting down operation from a said fictitious digit, a sender release key for starting the operation of said steering out chain, means controlled by said steering in chain for terminating the operation of said steering out chain at any given step therein and a reorder key for restarting the operation of said steering out chain whereby a number entered into said storage registers may be transmitted repeatedly.

10. A sender for controlling the transmission of numbers in the form of a series of trains of digital pulses, said trains being separated by uniform time intervals, consisting of a transmitting register comprising a series of binary trigger circuits connected in cascade to form a counter, a timing means for operating said counter at a predetermined rate, means for successively and alternately entering into said register representations of regular digits for transmission and fictitious digits for marking time constituting said uniform time intervals, said last means being controlled by an additional binary trigger circuit connected in cascade to said trigger circuits forming said counter to indicate the odd and even number of operations of said counter, the entry of each digit, regular or fictitious, being controlled by the completion of the counting of a preceding digit, fictitious or regular, signalled by an operation of said even and odd counter, whereby said transmitting register operates regularly, periodically and constantly until a complete number has been transmitted, and means controlled by said counter for transmitting a digital pulse for each count of a said regular digit.

11. A plurality of bistable trigger circuits connected in cascade to form a binary counter to produce an uninterrupted count of serially related signals in successive groups alternately representing digits for transmission and fictitious digits for marking time, means responsive to the completion of the count of the signals of each said group for entering into said counter the signals for a succeeding group, a dial pulse transmission circuit, means responsive to the counting of the signals constituting said digit for transmission for transmitting over said dial pulse transmission circuit a train of dial pulses and means responsive to the counting of signals constituting said fictitious digit for marking time to exclude dial pulses from said dial pulse transmission circuit and a continuously operating timing means to operate said counter at a conventional dial pulse rate.

12. A plurality of bistable trigger circuits connected in cascade to form a binary counter to produce an uninterrupted count of serially related signals in successive groups alternately representing digits for transmission and fictitious digits for marking time, means responsive to the completion of the count of the signals of each said group for entering into said counter the signals for succeeding group, a dial pulse transmission circuit, means responsive to the counting of the signals constituting said digit for transmission for transmitting over said dial pulse transmission circuit a train of dial pulses and means responsive to the counting of signals constituting a said fictitious digit for marking time to exclude dial pulses from said dial pulse transmission circuit and a free running multivibrator for operating said counter at a predetermined dial pulse rate.

References Cited in the file of this patent
UNITED STATES PATENTS

| | | |
|---|---|---|
| 1,609,983 | Blessing | Dec. 7, 1926 |
| 2,145,079 | Gibson | Jan. 24, 1939 |
| 2,576,099 | Bray | Nov. 27, 1951 |
| 2,723,312 | McGuigan | Nov. 8, 1955 |
| 2,794,976 | Faulkner | June 4, 1957 |